J. T. DONAHOO.
IRRIGATING SYSTEM.
APPLICATION FILED JUNE 25, 1909.
994,065.
Patented May 30, 1911.
2 SHEETS—SHEET 1.
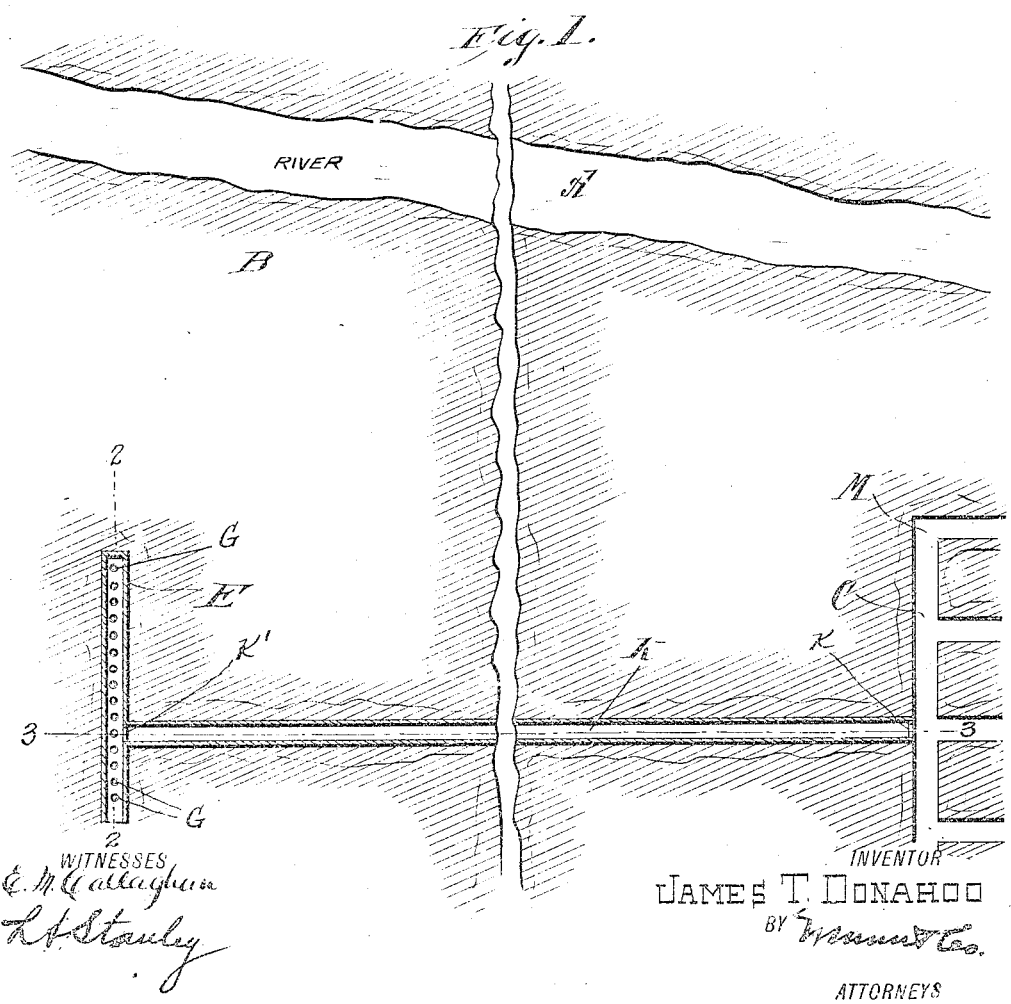
WITNESSES
E. M. Callaghan
L. A. Stanley
INVENTOR
JAMES T. DONAHOO
BY
ATTORNEYS

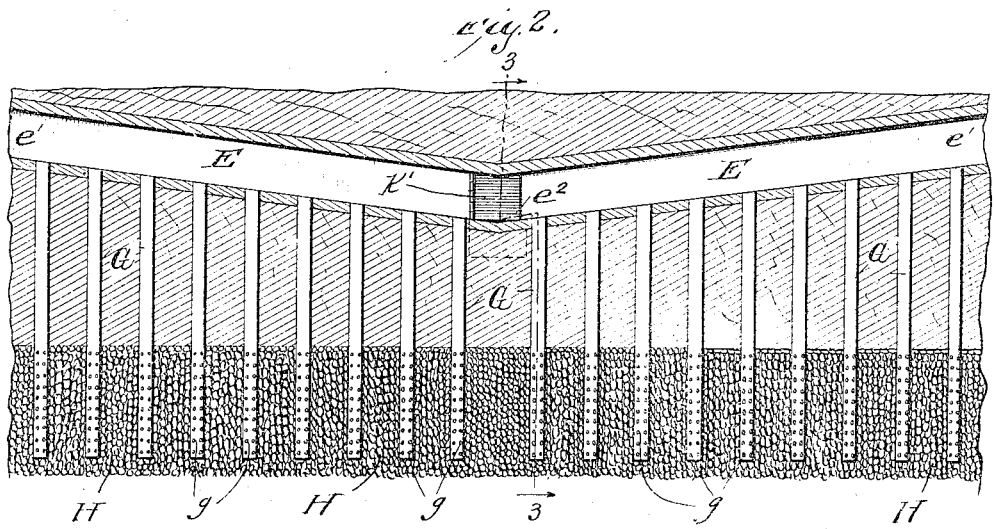
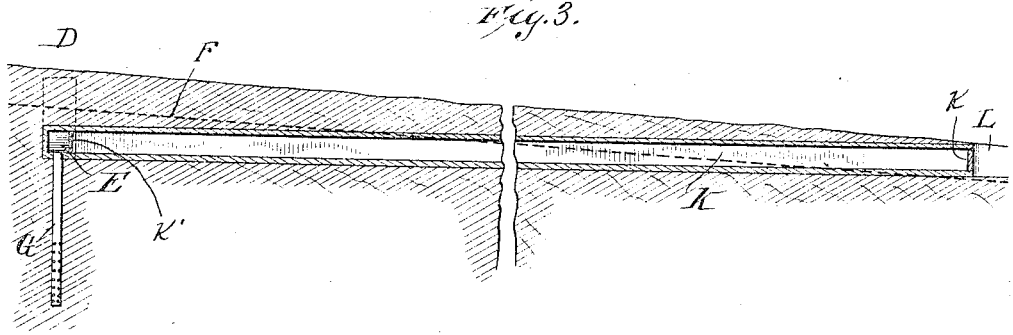

UNITED STATES PATENT OFFICE.

JAMES TABB DONAHOO, OF EDGAR, NEBRASKA.

IRRIGATING SYSTEM.

994,065.

Specification of Letters Patent.   Patented May 30, 1911.

Application filed June 25, 1909. Serial No. 504,257.

*To all whom it may concern:*

Be it known that I, JAMES T. DONAHOO, a citizen of the United States, and a resident of Edgar, in the county of Clay and State of Nebraska, have invented a new and useful Improvement in Irrigating Systems, of which the following is a specification.

My invention relates to means for irrigating lands, and it consists in the constructions, combinations and arrangements herein described and claimed.

An object of my invention is to provide a system of irrigation which may be successfully employed in those valleys in which there is a stream of water at whose level the land of the valley is more or less wet.

A further object of my invention is to provide an irrigating system in which lands at some distance from the stream may be irrigated without the necessity of constructing ditches or canals leading from the stream itself.

A further object is to provide novel apparatus for accomplishing the irrigation of the lands in an economical manner.

Other objects and advantages will appear in the following specifications and the novel features of the device will be particularly pointed out in the appended claim.

My invention is illustrated in the accompanying drawing, in which—

Figure 1 is a plan view, partly in section, along the line 1—1 of Fig. 2. Fig. 2 is a sectional view along the line 2—2 of Fig. 1. Fig. 3 is a section along the line 3—3 of Fig. 1.

In many of the valleys in the arid regions, through which rivers or streams of water flow, it will be found that the surrounding country for miles around contains water which may be found practically at the level of the river or stream itself. In some instances wells have been sunk and pumps installed to pump up the water. This is expensive and requires the services of an operator to attend the engine or other motive power. My invention does away with the necessity of pumps or other water lifting machinery and depends on gravity alone.

In the drawing, A denotes a river which flows through a valley B. The tract at C is the land to be irrigated which may be at a considerable distance from the river A and above the level of the nearest point of the river. Starting back at a point D where the land is higher, I construct a conduit E of cement or other material, the top of which is below the level of the river, (as shown at F in dotted lines in Fig. 3). This conduit is made air tight, but slopes from the outer ends $e'$ to the center $e^2$. From the bottom of the conduit I run a series of vertical pipes or tubes G down into the water bearing gravel H, as shown in Fig. 2. These tubes are perforated at $g$ to permit the entrance of water while keeping out the sand.

Leading from the conduit E, at the place where the sloping branches converge, is a lateral conduit K, which extends to the portion C of the land to be irrigated. This conduit is approximately level, but may be inclined to accelerate the flow. As will be seen from Fig. 3, it intersects the surface L of the land, and thus brings the water, which rises into the conduit E, out upon the surface C whence it may be distributed by the ordinary irrigating ditches M, as shown in Fig. 1. The flow may be regulated by a headgate $k$ at the end of the conduit K or by means of the gate $k'$ where the conduit K joins the conduit E.

From the foregoing description of the various parts of the system, the operation thereof will be readily understood. The perforated pipes G which extend down into the water bearing stratum will become filled with water, which will rise in the pipes, into the water-tight conduit E, and will then flow through the conduit down to its central point. In the construction just described, the inclinations of the portions of the conduit E, from the ends toward the center, will increase the flow of water, so that when the conduit is full and the head gate at $k$ is open the flow of water through the head-gate and through the pipe K will cause a vacuum and the suction thus created will tend to draw up the water from the lower levels into the conduit. Thus a continuous siphon action is maintained which may be regulated by opening or closing the head-gate at $e$.

The system thus described provides for a continuous flow of water without any other apparatus, and, as described, this flow may be regulated by means of the head-gate, as desired.

I claim:

In an irrigating system for sloping land, a main under-ground imperforate conduit, said conduit consisting of two portions inclined downwardly to a common center, a water tight lateral conduit extending from said common center and intersecting the sloping surface of the land at a point below the top of said main conduit, a head gate at the point of intersection of said lateral conduit with the center of the main conduit, and a series of perforated pipes extending downwardly from said main conduit into a water bearing stratum.

JAMES TABB DONAHOO.

Witnesses:
F. J. HENDERSON,
M. D. ARMOUR.